Patented Aug. 5, 1924.

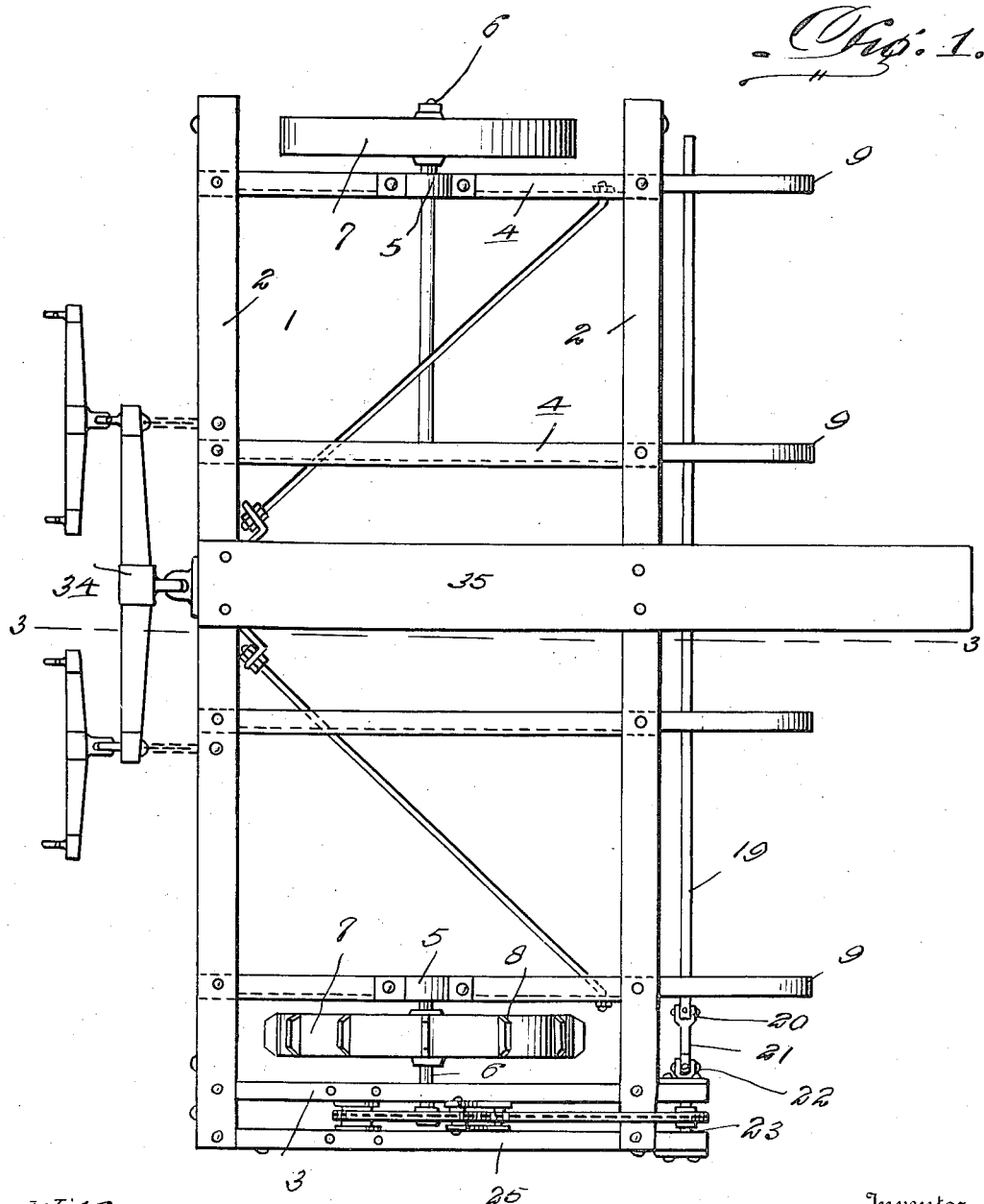

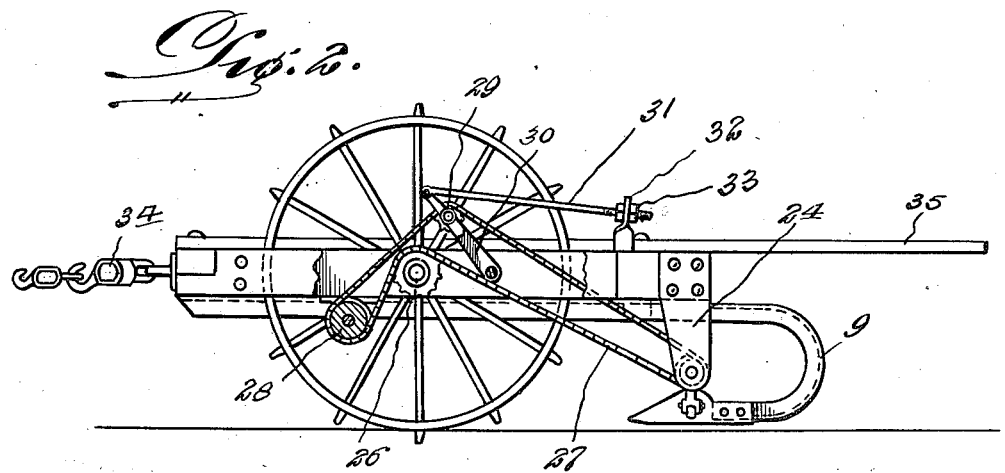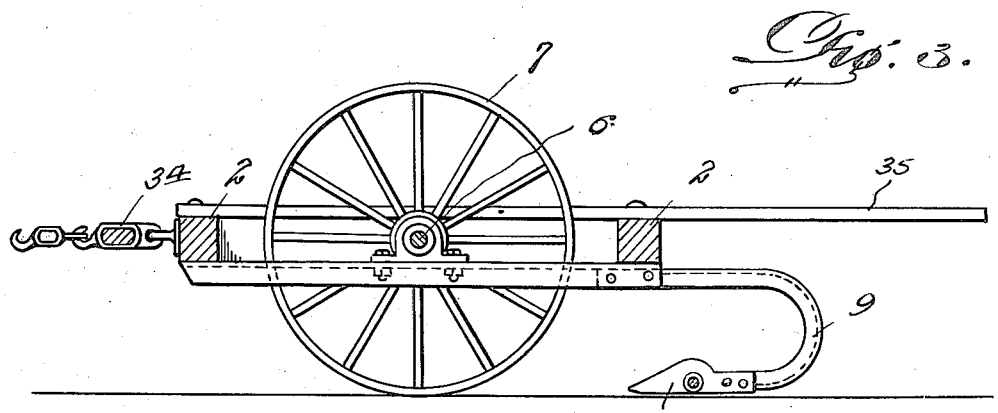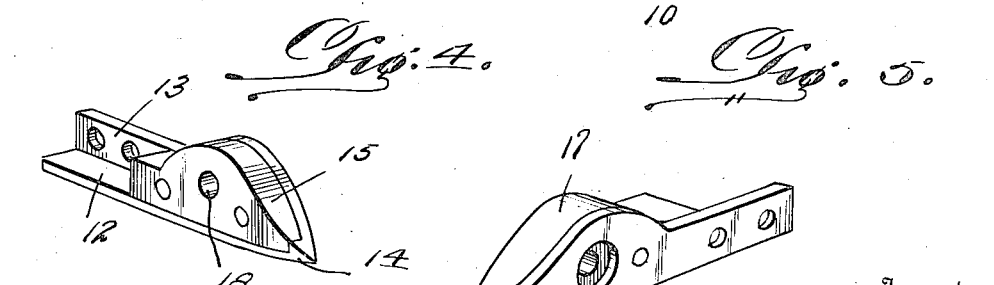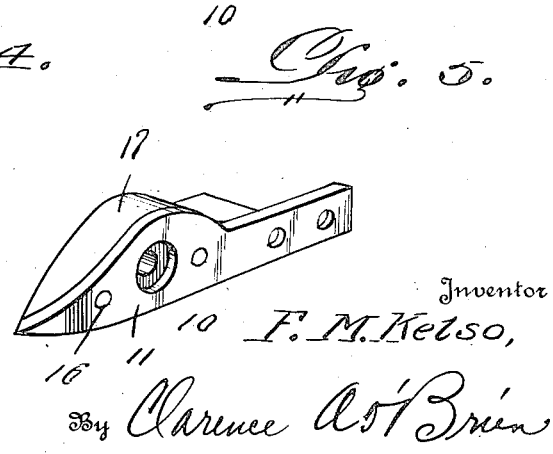

1,503,654

UNITED STATES PATENT OFFICE.

FRANCIS M. KELSO, OF LIND, WASHINGTON.

WEED EXTERMINATOR.

Application filed October 21, 1922. Serial No. 595,935.

*To all whom it may concern:*

Be it known that I, FRANCIS M. KELSO, a citizen of the United States, residing at Lind, in the county of Adams and State of Washington, have invented new and useful Improvements in Weed Exterminators, of which the following is a specification.

In carrying out the present invention it is my purpose to improve and simplify the general construction of weed exterminators and to provide a weed exterminator which will operate positively and efficiently to pull or exterminate the weeds and which will embody comparatively few parts, and these so arranged and correlated as to reduce the possibility of derangement to a minimum.

With the above recited objects in view, and others of a similar nature, the invention resides in the construction, combination and arrangement of parts set forth in and falling within the scope of the appended claim.

In the accompanying drawings:

Figure 1 is a top plan view of a weed exterminator constructed in accordance with my invention.

Figure 2 is a view in side elevation of the same.

Figure 3 is a cross sectional view on the line 3—3 of Figure 1.

Figures 4 and 5 are detail perspective views of one of the teeth.

Referring now to the drawings in detail, 1 designates a substantially rectangular frame comprising front and rear bars 2—2 and an end bar 3 interconnecting the front and rear bars 2—2, clearly shown in Figure 1 of the drawings. Arranged transversely of the frame 1 and connected to the front and rear bars 2 are channel irons 4 spaced apart in parallelism with one another and with the end bar 3. The channel irons 4 adjacent to the respective ends of the frame are formed with bearings 5 and journaled in these alining bearings are axles 6 that carry ground wheels 7, one of these ground wheels 7 being formed with radial earth engaging prongs 8 in order to insure the positive rotation of such ground wheel for a purpose hereinafter described. The axle 6 of the ground wheel at the right hand side of the frame extends through the bearing 5 and has its inner end journaled in the adjacent channel iron 4, as clearly shown in Figure 1 of the drawings. The ends of the channel irons 4 terminate flush with the rear bar 2 and connected with the rear end of the respective channel irons 4 are rearwardly extending downwardly curved sections 9. On the lower end of each section 9 is a tooth 10 shown in detail in Figures 4 and 5 of the drawings. In the present instance, each tooth 10 comprises a main body portion 11 of metal bent to provide a horizontal earth engaging flange 12 and an upwardly extending vertical flange 13. These flanges at the front end of the tooth merge into a point 14 and behind the point 14 is a wooden block 15 that rests upon the flanges 12 and 13 and is riveted or otherwise secured thereto, as at 17. The upper edge of the block 15 and the contiguous end of the flange 13 are curved upwardly and rearwardly, as at 17, so as to provide an efficient and effective weed engaging prong.

These teeth 10 are formed with alining openings 18, and in the present instance the opening 18 of each tooth is formed through the block 17 and the adjacent part of the flange 13, as clearly illustrated in Figures 4 and 5 of the drawings.

Extending through these alining openings 18 is a shaft 19 adapted for rotation within the openings and connected to one end of the shaft 19 by means of a universal joint 20 is one end of a short shaft 21. The other end of this shaft 21 is connected through the medium of the universal point 22 with a stub shaft 23 that is carried by brackets 24 that depend from the rear end of the adjacent end bar 3 and the rear end of a supplemental end bar 25 that is fastened to the outer ends of the front and rear bars 2 a short distance from the adjacent end bar 3 and parallel therewith. The axle 6 of the pronged ground wheel 7 extends into the space between the bars 3 and 25 and is equipped with a sprocket wheel 26. Over this sprocket wheel and a sprocket wheel fixed to the shaft 23 is trained an endless chain 27 which is also trained over an idle roller 28 carried by the bars 3 and 25 and a tightener sprocket 29 carried by a bifurcated lever 30 pivoted between the bars 3 and 25. This lever 30 is connected to one end of a connecting rod 31, the other end of the rod 31 being fastened in a strap iron 32 that is carried by the rear bar 2, the end of the rod 31 in the strap iron 32 being locked therein by locking nuts 33, as clearly shown in Figure 2 of the drawings.

The front bar 2 is equipped with a double tree 34 to which the horses or other draft animals may be connected in order to pull the weeder over the ground. This double tree 34 is arranged at the draft center of the machine in the present instance, but in some cases it may be desirable to connect the double tree to the frame upon the right hand side of the center line, and for this purpose a clevis hook 34' is fastened to the front bar 2 at one side of the center line, clearly shown in Figure 1 of the drawings, to which the double tree 34 may be attached when desired.

Connected to the front bar 2 centrally of the frame and extending across the frame is a depth regulating board 35 that extends beyond the rear bar 2, and upon this board the operator of the machine may stand when it is desired to cause the teeth 10 to engage the earth at a greater depth.

In practice, the machine is drawn over the ground by the draft animals and the operator may stand upon the board 35 to regulate the height at which the teeth 10 travel over the ground or the depth at which such teeth shall enter the ground. As the machine moves along the pronged ground wheel 7 transmits power through the chain 27 to the shaft 23, thereby imparting a rotary motion to the shaft 19.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed is:

In a weed exterminator, a frame comprising front and rear bars and end bars, transverse channel irons extending across said frame and carried by said front and rear bars and projecting beyond said rear bar, axles journaled in said end bars and the adjacent transverse channel irons, ground wheels on said axles, respectively, curved sections carried by the rear ends of said channel irons, respectively, ground engaging teeth carried by the lower ends of said curved sections, each tooth comprising a body portion formed of a horizontal flange and a vertical flange and a block carried by said flanges, said flanges at the forward end of the tooth and the forward end portion of said block being formed to provide a penetrating prong or point.

In testimony whereof I affix my signature.

FRANCIS M. KELSO.